July 12, 1960 R. W. ASTHEIMER 2,945,131

MATCHING CIRCUIT FOR RADIATION DETECTORS

Filed Dec. 7, 1955

INVENTOR.
ROBERT W. ASTHEIMER,

BY John C. Blair

ATTORNEY.

United States Patent Office 2,945,131

Patented July 12, 1960

2,945,131

MATCHING CIRCUIT FOR RADIATION DETECTORS

Robert W. Astheimer, Springdale, Conn., assignor to Barnes Engineering Company, Stamford, Conn.

Filed Dec. 7, 1955, Ser. No. 551,491

8 Claims. (Cl. 250—214)

Figure 1:
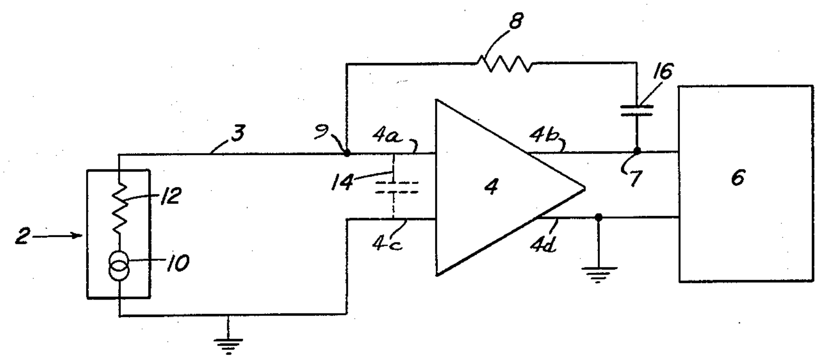

This invention relates to improved matching circuits for radiation detectors. More particularly it relates to circuits for matching high impedance radiation sensitive cells used as signal sources in radiation detectors to signal amplifiers without substantial loss of signal-to-noise ratio at high operating frequencies.

The radiation detectors with which this invention is particularly concerned utilize lead telluride cells and like devices to convert impinging radiation into electrical signals. These cells or like devices have two characteristic properties: a very high output impedance and an inherent noise spectrum whose amplitude decreases with frequency. To take advantage of the latter property, the radiation falling on such cells is usually "chopped," i.e. periodically interrupted by a slotted rotating disk. The disk is rotated at high speeds which results in high chopping frequencies, e.g. 20 kilocycles per second at which frequencies the inherent cell noise is relatively low. Cells of this type are biased from a direct voltage source, and as the resistance of the cell changes with variations in the radiation falling thereon, i.e., a varying direct signal voltage is developed which can be amplified by conventional alternating current amplifiers. Thus a cell upon which chopped radiation is falling may be considered the electrical equivalent of an alternating voltage generator, having a frequency the same as the chopping frequency, in series with the cell resistance. By choosing a high chopping frequency the cell may be operated in a frequency range where its noise is low, thus raising the output signal-to-noise ratio. However, when the output of a cell operating at a high frequency is connected to an alternating current amplifier to make use of the signal developed thereby several problems arise.

The usual method of sensing the signal from the cell is to connect a resistor in series with the cell and the biasing voltage. The voltage developed across this resistor, hereinafter called the "load resistor," is applied to the grid of a vacuum tube. Because of the inter-electrode capacitance of the input tube and distributed capacitance due to wiring, etc., it is desirable to make this load resistor relatively low in value so that the filter network formed by the load resistor and the distributed capacitance will not appreciably attenuate the cell signal. However, when the load resistor is made relatively small, not only is the output signal from the cell attenuated as would be expected, but the signal-to-noise ratio at the amplifier input decreases.

The reason for this phenomenon can best be understood by a comparison of the signal-to-noise ratios of relatively large and relatively small load resistors, both resistors being small when compared to the cell resistance. With either resistor, the signal at the grid of the amplifier input tube is determined by the ratio of the cell resistance and the load resistor. The noise at this same point comes from the two sources, i.e. the cell itself and the load resistor. The noise from the cell is attenuated in the same ratio as the signal, while the thermal noise of the load resistor is proportional to resistor size. When the value of the load resistor decreases both the cell signal and the noise decrease proportionally. However, the thermal noise due to the load resistor does not decrease in direct proportion to the diminution in size of the load resistor, but only in proportion to the square root of this change. Thus as the load resistor is reduced in value, the signal-to-noise ratio at the input grid becomes progressively poorer.

In practice it has not always been possible to select a value for the load resistor which is both small enough so that the filter comprising the load resistor and distributed capacitance does not attenuate the signal at the desired operating frequency, but still large enough to give acceptable signal-to-noise ratios at the input grid.

In prior devices the load resistor was made large enough to give an acceptable signal-to-noise ratio, and the resulting attenuation at the operating frequency was corrected by inserting a "lead" network which has a rising amplitude-frequency characteristic in subsequent amplifier stages. Such arrangements were unsatisfactory because of instability, and because it was difficult to match the drop off of the load resistor-distributed capacitance filter with the rising characteristic of the lead network to the accuracy required for use as a measuring instrument.

Accordingly, a general object of this invention is to provide a radiometer having improved accuracy and signal-to-noise ratio. A more specific object is to provide a circuit for matching high impedance high frequency radiation-sensitive cells with circuits utilizing their signals which permit such cells to operate at high chopping frequencies without decrease in signal-to-noise ratio. Another object is to provide a device of the above character for use with photo-conductive radiation detectors such as lead telluride cells and photo-multipliers. A further object of this invention is to provide a signal source of the character described having a low output impedance. Still another object is to provide a specific low noise signal source of the character described which is simple and economical in construction and efficient in operation. Other objects of the invention will be in part obvious and will in part appear hereinafter.

The invention accordingly comprises the features of construction, combinations of elements, and arrangements of parts which will be exemplified in the construction hereinafter set forth, and the scope of the invention will be indicated in the claims.

Figure 2:
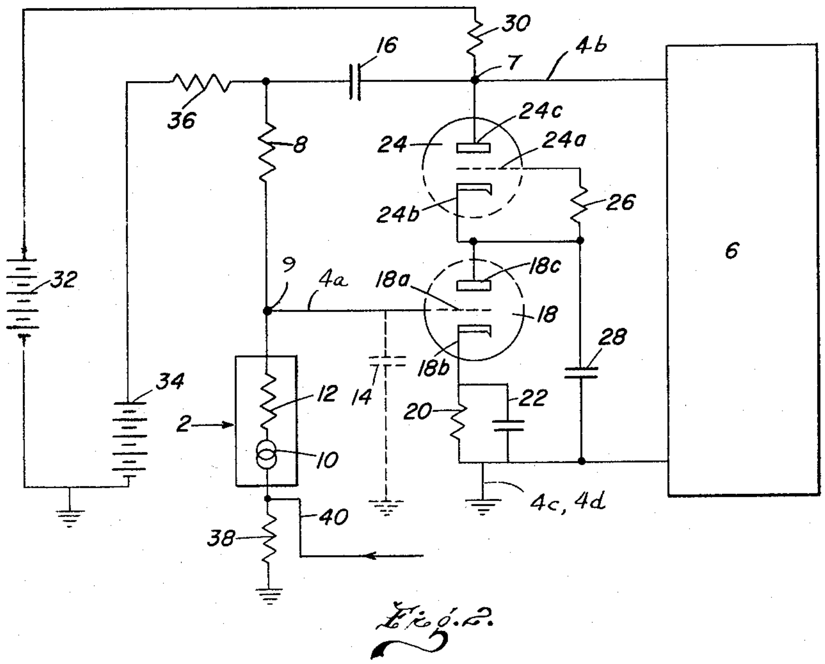

For a fuller understanding of the nature and objects of the invention, reference should be had to the following detailed description taken in connection with the accompanying drawing in which:

Figure 1 is a generalized block diagram of a radiometer incorporating the matching circuit of this invention, and Figure 2 is a schematic diagram of a specific circuit particularly adapted for use in the generalized circuit of Figure 1.

Similar reference characters refer to similar parts throughout the several views of the drawing.

I have found in general that if the cell is made a part of the feedback network associated with a high gain alternating current amplifier, it may be operated at a high frequency where its inherent noise is low, without decrease in output signal-to-noise ratio because of a low value of load resistance. Thus, as shown in Figure 1, a photo-conductive radiation detector such as a lead telluride cell generally indicated at 2 is connected directly to the input of alternating current amplifier 4. The output of amplifier 4 is fed to the circuit 6 in which the cell signal is to be used; amplifier 4 is a feedback amplifier, the feedback ratio being determined by the relative values of resistor 8 and the cell resistance. The gain of this circuit approaches the ratio of load to cell resistance as the amplification of amplifier 4 becomes large, which is essentially the gain of the circuit previously discussed. Thus in the circuit of this invention resistor 8 corresponds to the load resistor of prior circuits, and the input impedance to the amplifier 4 is essentially equal to the value of resistor 8 divided by the gain of amplifier 4 in the circuit of Figure 1. Although this circuit provides neither an appreciable increase in gain over the conventional circuit nor a decrease in the effect of the thermal noise from resistor 8, it permits a high value resistor to be used for resistor 8. Thus the signal-to-noise ratio of the signal appearing at the input of the circuit 6 will not be limited by the thermal noise of the load resistor 8. Also, since the input impedance to amplifier 4 is reduced, the equivalent resistor across its input terminals appears small; this raises the frequency at which the filter formed by the equivalent resistor and the distributor capacitance of amplifier 4 begins to attenuate the signal generated by cell 2. A preferred circuit for the amplifier 4, a cascode circuit, is shown in Figure 2, and is described in detail hereinafter.

More specifically, referring to Figure 1, the cell generally indicated at 2 is shown in equivalent form having an alternating voltage generator 10 in series with cell resistance 12. Typical cells which might be used are lead telluride cells, photo-multiplier cells, or high vacuum photocells, which may be sensitive either to visible or infra-red radiation. The energy impinging on these cells is chopped at a high frequency to make the output signal an alternating one. Capacitor 14, shown with dotted lines, represents the distributed capacitance both across the cell and at the input to amplifier 4. The output of amplifier 4 is fed to the circuit 6 which, as previously explained, utilizes the signal from the cell 2 and would usually be an amplifier in combination with a measuring device. The output of amplifier 4 at junction 7 is also connected via condenser 16 and load resistor 8 to a junction 9 of an active amplifier input terminal 4*a* and a lead 3 from cell 2. To operate in a stable fashion and give desirable results in this circuit the output of amplifier 4 should be 180° out of phase with its input thus the amplifier may have active input and output terminals 4*a* and 4*b* with resistor 8 connected therebetween and grounded terminals 4*b* and 4*c*. Its gain should be high, preferably greater than 150 from input to output.

It should be noted that the circuit of Figure 1 is schematic, and represents only the alternating current or signal circuit. Direct voltage to excite cell 2, and a battery supply to provide plate voltage for the amplifier 4 are not shown although, of course, these would be part of a working circuit. It should also be noted that since the resistance 12 of cell 2 is much larger than resistor 8 there is heavy negative feedback around amplifier 4, and no appreciable increase in signal gain from the output of the equivalent generator 10 to the input terminals of the circuit 6 over that available with the usual matching network. In fact, as previously explained, the signal is attenuated by the ratio of resistor 8 to resistance 12, which attenuation is identical to the attenuation in the circuit heretofore used. Similarly, there is no appreciable increase in the signal-to-noise ratio of the signal developed by the cell 2 except that which is the result of the low noise resulting from higher permitted operating frequency. However, since the input impedance to amplifier 4 has been lowered in direct proportion to its increase in amplification, a large value resistor may be used for the resistor 8, without appreciable attenuation at high frequencies due to distributed capacitance 14. Since resistor 8 is a relatively large value, the output signal from the cell is not limited by the noise developed therein. The output impedance of the amplifier is also relatively low because of the negative feed-back, a desirable feature in a voltage source.

Thus the circuit for matching the cell 2 to the circuit 6 includes the amplifier 4 and a feedback element including resistor 8.

Several different circuits might be used for amplifier 4. However in the simplest, a single triode, the gain is generally too low; a single triode also has high effective interelectrode capacitance due to the Miller effect, which is reflected as a high equivalent capacitor 14. Two triodes cannot be used in cascade since the voltage at the output is incorrect in phase. Although three triodes in cascade will provide sufficient gain, and an output signal of the proper phase, they are uneconomical in that two tube envelopes are required and special precautions must be taken to maintain stability with the large amount of feedback used. A single pentode might be used since it has sufficient gain, but pentodes are noisier than triodes and therefore not desirable. I have found that the "cascode" circuit of Figure 2 is preferable for use as the amplifier. This circuit utilizes two triodes, connected so that the plate of one triode is directly connected to the cathode of the other. The output of this circuit is 180° out of phase with the input since one of the tubes is cathode driven. The circuit has a relatively high gain for a two tube amplifier and since triodes are used, the noise is low. Because the output is taken from one tube, while the input grid is an element of another tube, the circuit has low input capacitance.

In Figure 2, the cell generally indicated at 2 is connected between the grid 18*a* of triode 18 and ground, the cathode 18*b* being connected to ground through the parallel combination of resistor 20 and condenser 22 in conventional fashion. The plate load for triode 18 is the second triode 24. Thus plate 18*c* of triode 18 is connected directly to the cathode 24*b* of triode 24, grid 24*a* being connected through resistor 26 to the junction of cathode 24*b* and plate 18*c*. Resistor 26 holds grid 24*a* at the contact potential of the tube thus insuring maximum gain from tube 24. Condenser 28 bypasses any voltage surge appearing at the cathode 24*b*. Plate voltage is supplied to plate 24*c* through plate resistor 30 from a source 32 illustratively shown as a battery. Biasing potential is supplied to cell 2 from a source 34, also illustratively shown as a battery, through a current limiting resistor 36. Condenser 16 serves to prevent the direct plate voltage from reaching the cell. A resistor 38 may be connected between cell 2 and ground for calibration purposes. A calibration signal may then be supplied on lead 40 and thus across resistor 38, which is very much smaller than either resistor 8 or resistance 12. A voltage developed across resistor 38 will be amplified exactly as if developed by generator 10 and it is therefore a convenient calibration point, giving an exact measure of the gain between generator 10 and the output of the radiation detector. The remainder of the circuit of Figure 2 is identical to the schematic circuit of Figure 1 and corresponding parts therein have the same reference characters.

Using typical circuit values for the amplifier of Figure 2, it has been found that its gain, using conventional triodes, is about 200, which is sufficiently high so that the total gain from cell 2 to the circuit 6 is substantially equal to the ratio of load resistor 8 to cell resistance 12. In a typical cell, cell resistance 12 (as seen in Figure 1) is of the order of 200 megohms. With such a resistance value for the cell, it is desirable that the load resistor 8 be of the order of 10 megohms resulting in a gain between cell 2 and circuit 6 of about 1/20. Using these values of resistance it can be shown that the input impedance at grid 18*a* of triode 18 is of the order of 50,000 ohms while the output impedance is of the order of 500 ohms. Because of this rather low input impedance, cell 2 can be operated at extremely high frequencies without appreciable attenuation due to distributed capacitance 14. Further, although resistor 8 is only 1/20 the value of cell resistance 12, it is high enough so that the signal-to-noise ratio of the output of the cell is limited by cell noise rather than by the noise from the resistor 8.

Thus I have provided an improved matching circuit for radiation detectors utilizing devices such as lead telluride cells, high-vacuum photocells or photo-multiplier tubes said matching circuit permitting operation of these radiation sensitive cells at high frequencies, and having a low impedance output for coupling to subsequent circuits designed to utilize these signals. Since the matching circuit used in the signal source has a low input impedance, high value load resistors can be used, which result in the signal-to-noise ratio of the output of the cell being limited only by the inherent cell noise and not by the resistance used in the matching circuit. Not only have I described this circuit in general terms, specifying the requirements for a high gain alternating current amplifier, but I have also shown a specific circuit for accomplishing this result economically and simply. The particular circuit which I have described provides high gain with the proper phase relationship and a minimum number of tubes, has very low noise, and also has a low grid-to-plate capacity.

It will thus be seen that the objects set forth above, among those made apparent from the preceding description, are efficiently attained, and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all the generic and specific features of the invention herein described, and statements of the scope of the invention which, as a matter of language, might be said to fall therebetween.

I claim:

1. A radiation detector matching circuit for matching a radiation sensitive cell which provides a varying electrical signal when radiation of varying intensity impinges thereon to a circuit to utilize the signals from said cell comprising, in combination, a high impedance high frequency radiation sensitive cell, a high gain alternating current amplifier having a gain of at least 150 whose input terminals are connected to said cell; and a feedback network associated with said amplifier, said feedback network including a resistor whose resistance is smaller than the resistance of said cell and a condenser connected in series between an input and an output terminal of said amplifier so that the voltage fed back to said input terminal is substantially in phase opposition to the input voltage to said terminal; the output terminals of said amplifier being connected to the circuit for utilizing said cell signals whereby said cell may be operated at high frequencies without attenuation by the filter formed by the distributed capacitance of said matching circuit and said resistor.

2. The matching circuit defined in claim 1 in which said cell is a lead telluride cell.

3. The matching circuit defined in claim 1 in which said cell is a photo-multiplier cell.

4. The matching circuit defined in claim 1 in which said cell is a high vacuum photocell.

5. A radiation detector matching circuit for matching a radiation sensitive cell which provides a varying electrical signal when radiation of varying intensity impinges thereon to a circuit to utilize the signal from said cell comprising, in combination, a radiation sensitive cell a first triode vacuum tube, means for connecting one terminal of said cell to the grid of said first triode tube, means for biasing the cathode of said first triode tube, means for connecting the other terminal of said cell to said biasing means, a second triode vacuum tube, the plate of said first triode tube being connected to the cathode of said second triode tube, a resistor connected between the cathode of said second triode and the grid of said second triode, a condenser connecting the cathode of said second triode and the plate of said first triode to ground, a plate resistor connected between the plate of said second triode and a source of direct voltage, a resistor and condenser in series connected between the plate of said second triode and the grid of said first triode, whereby there is fed back to said grid a voltage substantially in phase opposition to the input signal from said cell, and means for electrically exciting said cell, the output from said matching circuit being taken between ground and the plate of said second triode, whereby said cell may be operated at high frequencies without attenuation by the filter formed by the distributed capacitance of said matching circuit and said resistor connected between the plate of said second triode and the grid of said first triode.

6. The matching circuit defined in claim 5 in which said resistor connected between the plate of said second triode and the grid of said first triode is smaller than the resistance of said cell.

7. The matching circuit defined in claim 5 in which the gain of said amplifier formed by said triodes is at least 150.

8. The matching circuit defined in claim 5 in which a calibration resistor is inserted in series with said cell, said calibration resistor being smaller than the resistance of said cell and the resistance of said resistor connected between the plate of said second triode and the grid of said first triode, and means for inserting a calibration signal across said resistor, whereby the gain of said matching circuit may be measured.

References Cited in the file of this patent

UNITED STATES PATENTS

| | | |
|---|---|---|
| 2,194,175 | Wilhelm | Mar. 19, 1940 |
| 2,202,522 | Gloess | May 28, 1940 |
| 2,267,690 | Albersheim | Dec. 23, 1941 |
| 2,499,921 | Hurley | Mar. 7, 1950 |
| 2,518,115 | Bernstein | Aug. 8, 1950 |
| 2,547,662 | Rich et al. | Apr. 3, 1951 |
| 2,605,430 | Marcy | July 29, 1952 |
| 2,714,160 | MacDougall | July 26, 1955 |
| 2,718,612 | Willis | Sept. 20, 1955 |
| 2,801,342 | Jones | July 30, 1957 |

FOREIGN PATENTS

| | | |
|---|---|---|
| 893,068 | France | Jan. 17, 1944 |